United States Patent [19]

Salete

[11] 3,924,899

[45] Dec. 9, 1975

[54] AUTOMATIC CHOKE RELIEF VALVES SYSTEM FOR PNEUMATIC CONVEYANCE

[76] Inventor: Felipe Salete, Cerro de Macuiltepec No. 449, Col. Campestre Churubusco, Mexico City, Mexico

[22] Filed: Sept. 21, 1973

[21] Appl. No.: 399,586

[30] Foreign Application Priority Data

July 27, 1973  Mexico .............................. 145167

[52] U.S. Cl. ..................... 302/35; 302/32; 302/64
[51] Int. Cl.² ........................................ B65G 53/66
[58] Field of Search ............. 302/32, 35, 64; 243/38

[56] References Cited

UNITED STATES PATENTS

| | | | |
|---|---|---|---|
| 1,246,189 | 11/1917 | Vanderlip | 302/64 X |
| 2,140,128 | 12/1938 | Craggs | 302/28 |
| 2,190,565 | 2/1940 | Joyce | 302/32 X |
| 2,644,722 | 7/1953 | Childress | 302/32 |
| 2,715,461 | 8/1955 | Maulsby | 302/32 X |
| 3,307,576 | 3/1967 | Himes et al. | 302/32 X |

FOREIGN PATENTS OR APPLICATIONS

| | | | |
|---|---|---|---|
| 920,039 | 3/1963 | United Kingdom | 302/32 |
| 745,934 | 11/1966 | United Kingdom | 302/32 |

Primary Examiner—Evon C. Blunk
Assistant Examiner—Jeffrey V. Nase
Attorney, Agent, or Firm—Ladas, Parry, Von Gehr, Goldsmith & Deschamps

[57] ABSTRACT

This invention refers to a system of valves which operates automatically to prevent stoppage or choke in the pneumatic conveyance of milling products which consists of a conveying line formed by grain conveying tubes which are interconnected. Said conveying line includes in change of direction portions flat plates which are freely supported by hinges attached to the conveying tubes; in straight horizontal portions openings which are covered by circularly curved plates freely supported by pins, which pins are attached to the conveying tubes; and in straight vertical portions opposite openings, which opposite openings are covered by circularly curved plates that are slidingly supported by pins fixed to the portion of the conveying tube which is closest to the lower end portion of the openings and between which circularly curved plates there are stops attached to the conveying tube, that prevent the turning of said circularly curved plates.

16 Claims, 11 Drawing Figures

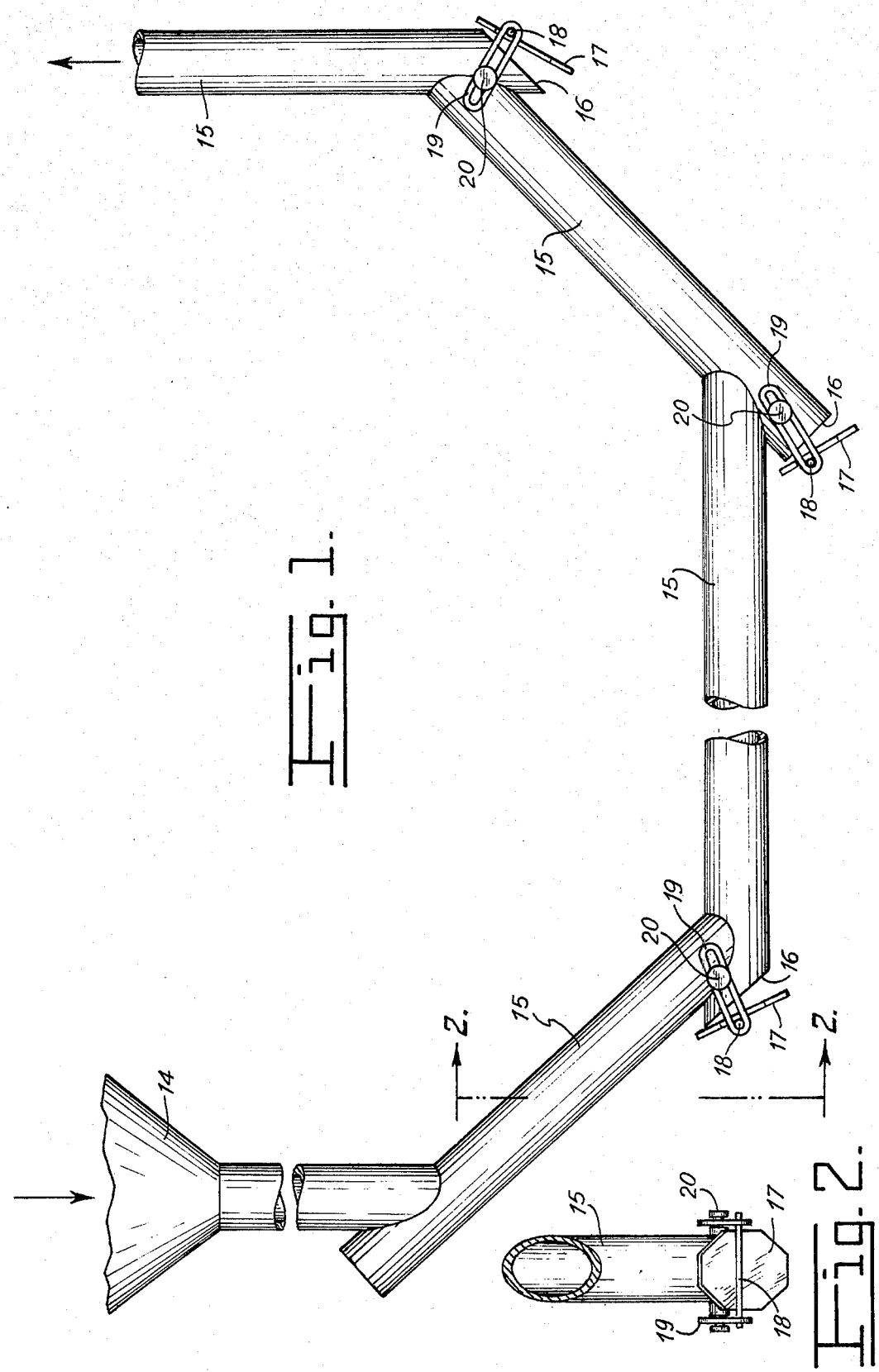

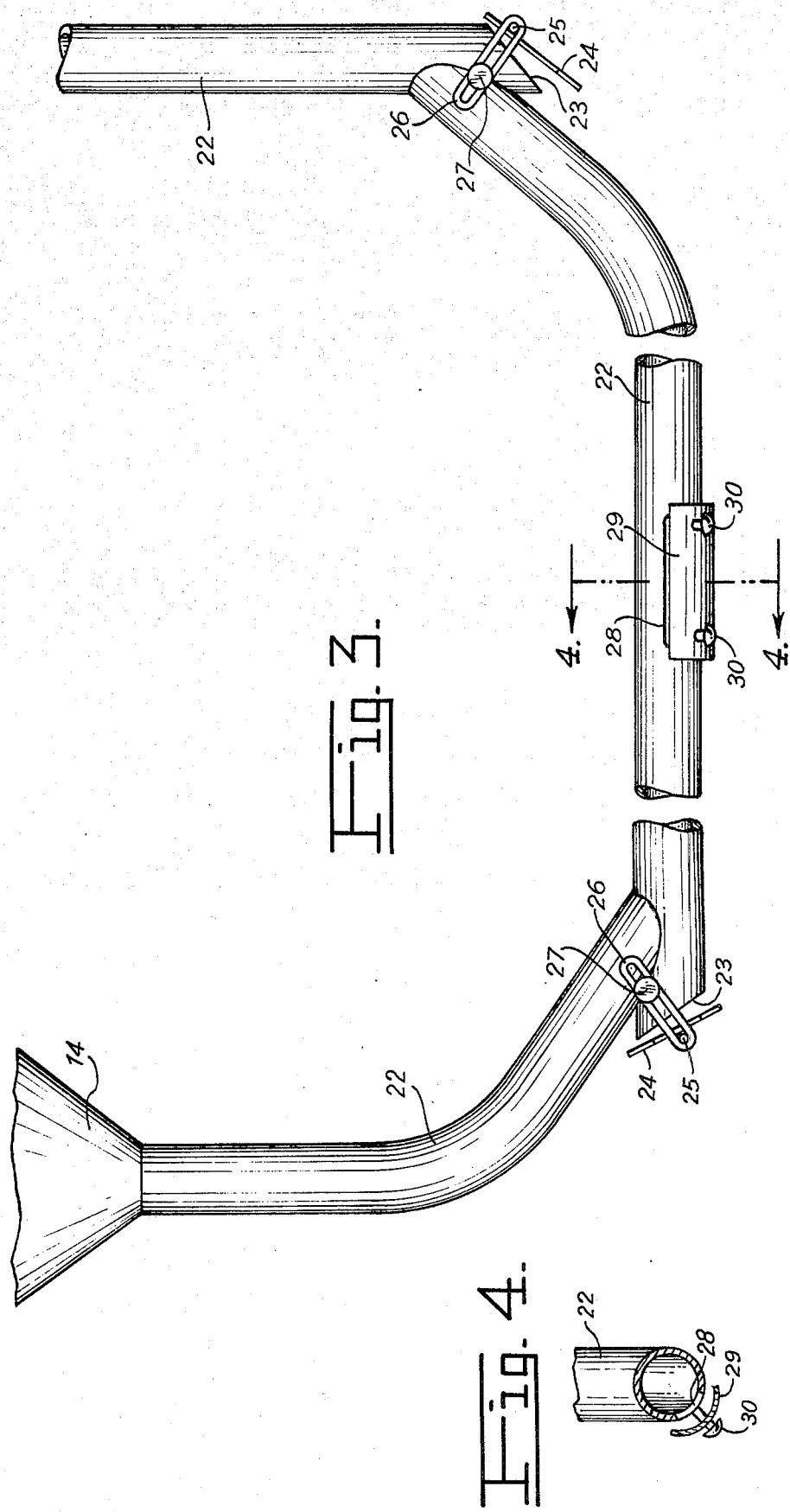

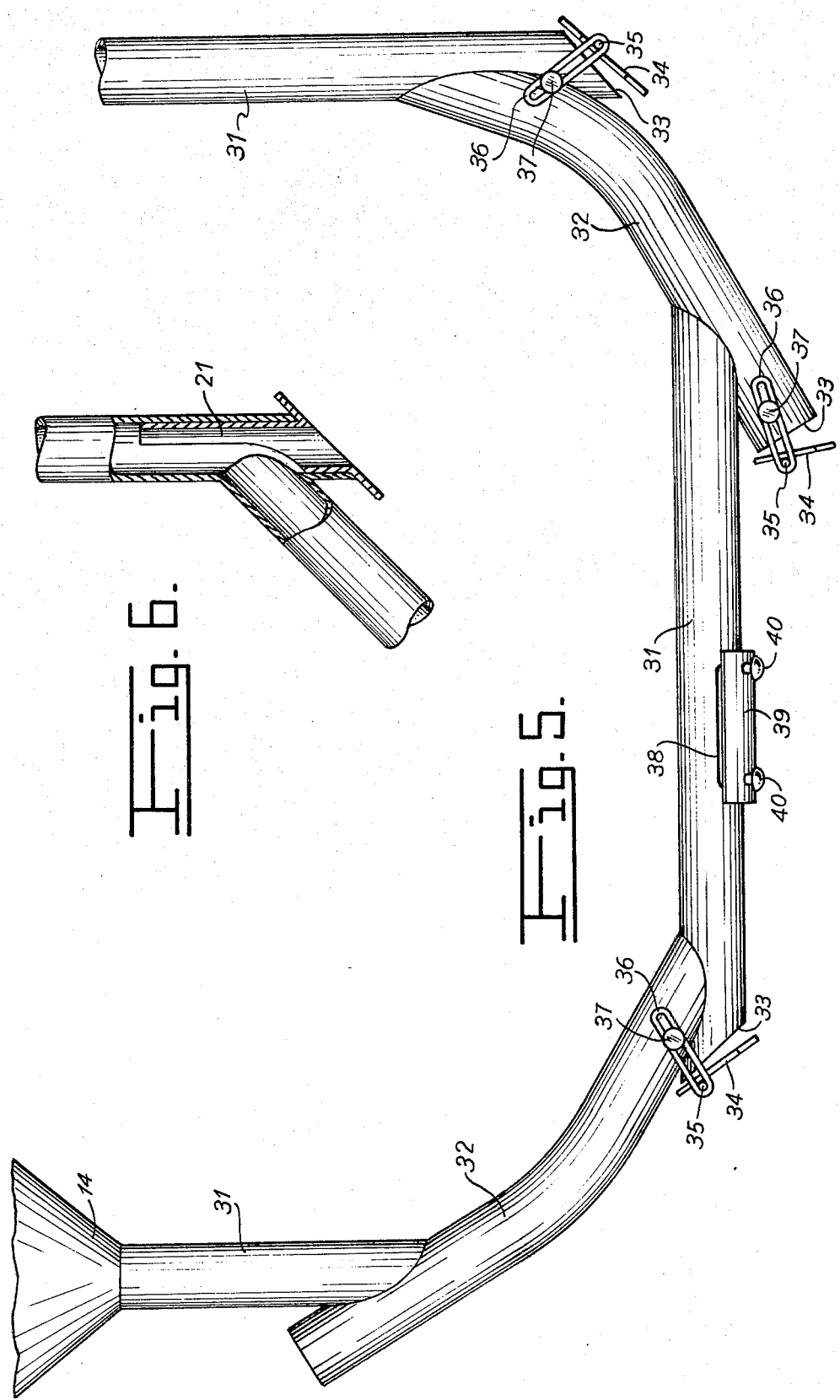

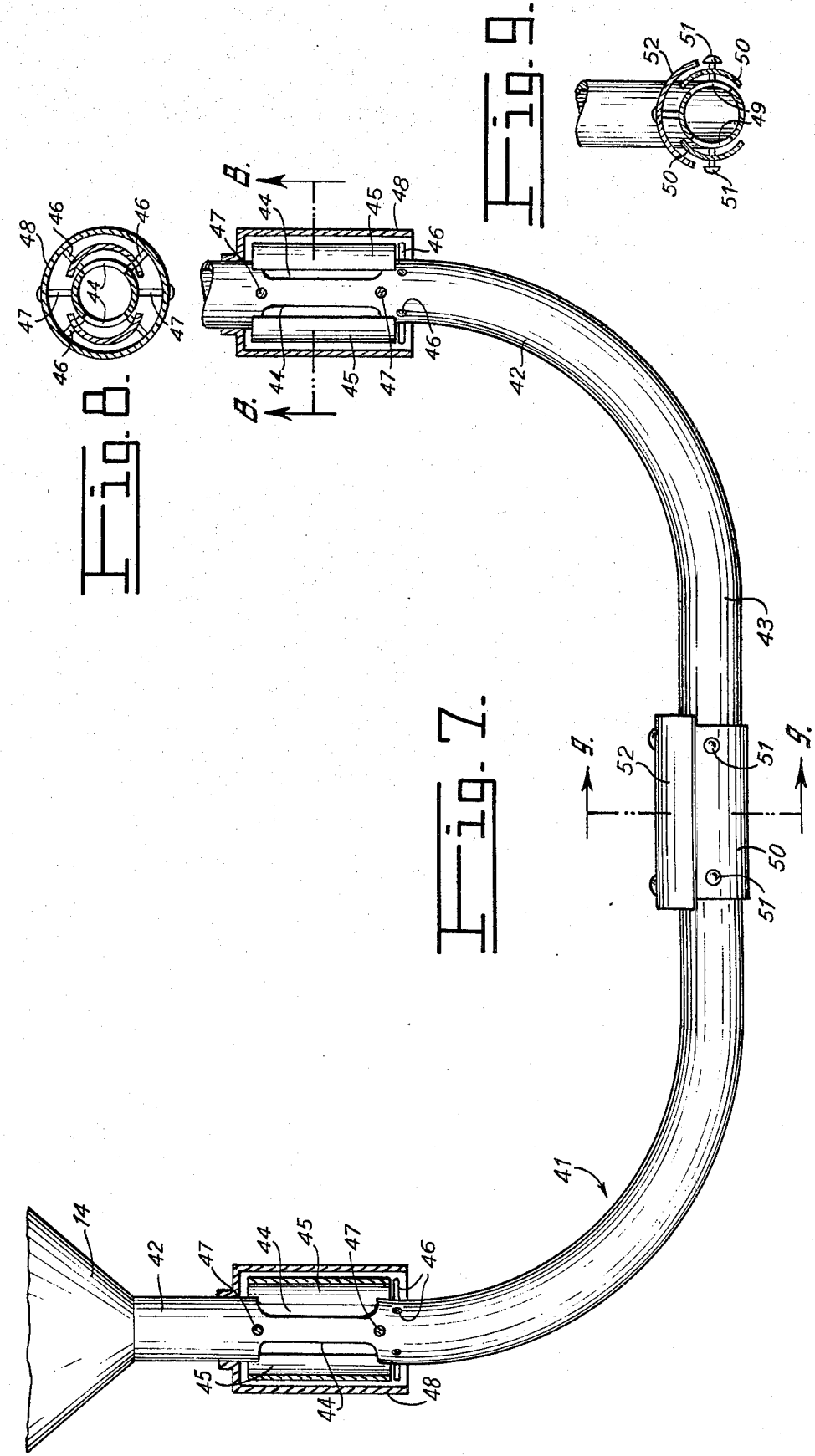

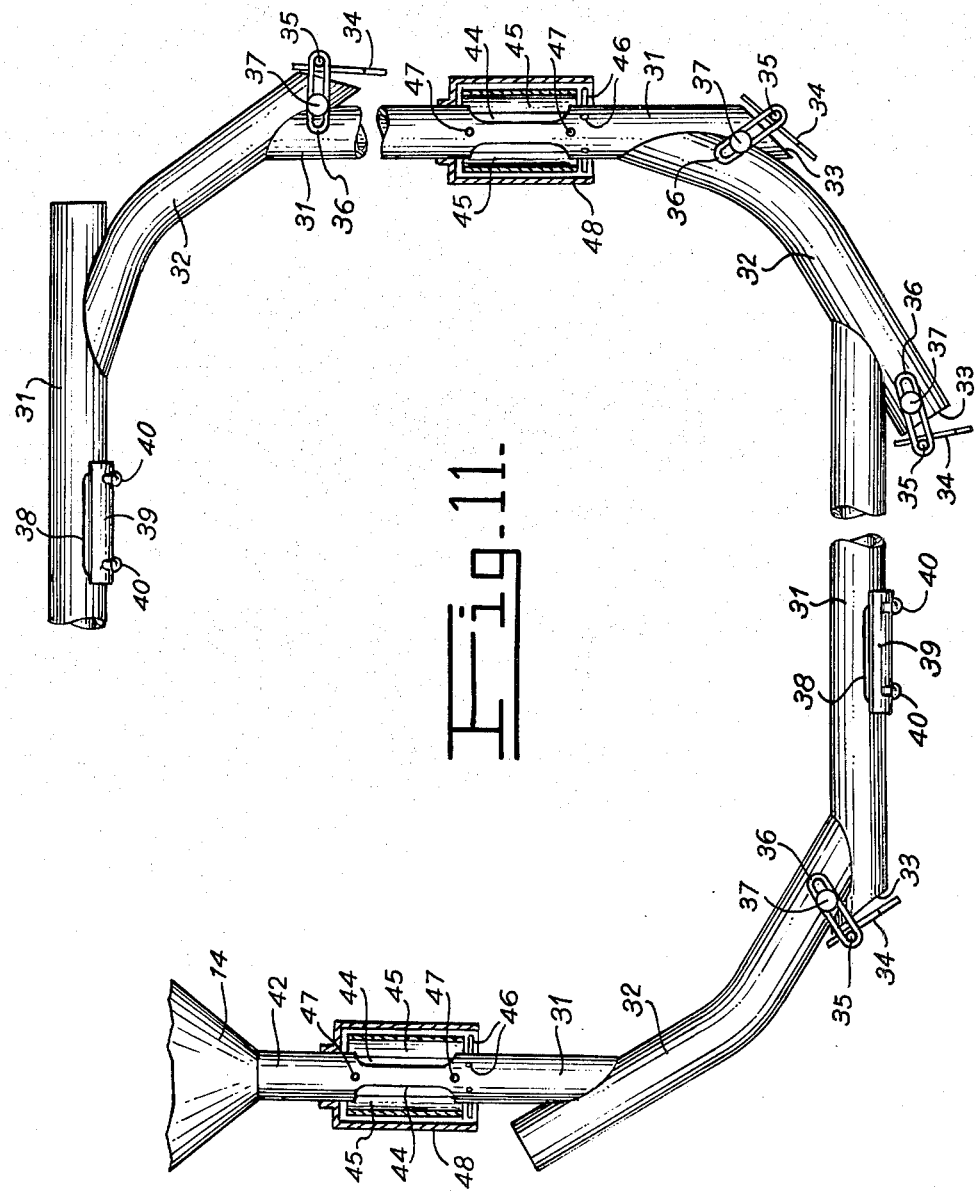

3,924,899

AUTOMATIC CHOKE RELIEF VALVES SYSTEM FOR PNEUMATIC CONVEYANCE

BACKGROUND OF THE INVENTION

An extremely important problem which has occurred in the pneumatic conveyance of bulk products of mills is the stoppage or blocking of the conveying lines. Therefore, in the above instance, it is necessary to stop the general load, for example, in a mill braking the sequence of the milling process; then the tubes must be taken apart and cleaned with wires, rods or bars; the machines must be stopped; the mill cylinders disconnected; the flow of the product diverted; and many other problems that trouble the milling operation. Logically, all the aforementioned problems provide the consequent loss of time until the normal milling process is restored.

The stoppage or choke problem may result from different causes, e.g., by an extra loading (which is the most usual) or differences in the electric current, with which the grain conveyance variates making impossible that same be continuous.

To date there are no processes nor automatic devices nor systems which prevent the aforementioned problem, which means that there is no other way, except for that which has been out lined, to avoid the stoppage or choke of the load in the pneumatic conveyance of bulk products.

OBJECTS OF THE INVENTION

Therefore, one object of this invention is to provide a system of valves which operates automatically to prevent the stoppage or choke in the pneumatic conveyance of milling products, and by which a constant flow of the product is attained.

Another object of this invention is to provide a system of valves which operates automatically to prevent the stoppage or choke in the pneumatic conveyance of milling products and which automatically discharges load excesses which for various reasons may build up in the milling process.

An additional object of this invention is to provide a system of valves which operates automatically to prevent the stoppage or choke in the pneumatic conveyance of milling products and which operates automatically when the normal capacity of conveyance is exceeded and which instantly reestablishes the conveyance of the product at its normal capacity.

A further object of this invention is to provide a system of valves which operates automatically to prevent the stoppage or choke in the pneumatic conveyance of milling products in which strong impacts of the product are prevented and which does not interrupt the flow of said product but rather eliminates load excesses and prevents turbulences.

Another object of this invention is to provide a system of valves which operates automatically to prevent the stoppage or choke in the pneumatic conveyance of milling products, and which may be adapted to any conveying line now in use.

Lastly, it is an object of this invention to provide a system of valves which operates automatically to prevent the stoppage or choke in the pneumatic conveyance of milling products and which consists of a conveying line comprising conveying grain tubes which are interconnected and which line includes in change of direction portions flat plates which are freely supported; in straight horizontal portions openings which are covered by freely supported circularly curved plates; and in straight vertical portions, opposite openings which are covered by circularly curved plates which are slidingly supported by pins and between which circularly curved plates there are stops attached to the conveying tube.

This and other objects to be attained from the use of this invention will be better understood and appreciated by the reading of the following description which refers to the drawings of the preferred embodiments of the present invention.

DESCRIPTION OF THE DRAWINGS

FIG. 1 is a side vertical sectional elevational view showing a part of the system of valves which operates automatically to prevent stoppage or choke in the pneumatic conveyance of milling products which is the subject of this invention.

FIG 2 es a detailed cross sectional view of section 2 — 2 of FIG. 1.

FIG. 3 is a side vertical elevational view which shows an ambodiment of the system of this invention which is different from the embodiment shown in FIG. 1.

FIG. 4 is a detailed cross sectional view which illustrates section 4 — 4 of FIG. 3.

FIG. 5 is a side vertical elevational view which shows another embodiment of the system of this invention.

FIG. 6 is a detailed conventional longitudinal sectional view which shows a protective sleeve of those portions where the changes of direction of the conveyance take place in this invention.

FIG. 7 is a side vertical elevational view which shows another embodiment of the system of this invention and which also shows detailed conventional longitudinal views of the straight vertical portions of said system. This embodiment may correspond to the adaptation of the system of this invention to a common conveying line which is already installed.

FIG. 8 is a cross sectional view of section 8 — 8 of FIG. 7.

FIG. 9 is a cross sectional view effected at 9 — 9 of FIG. 7.

FIG. 11 is a side vertical elevational view which illustrates the automatic choke relief valve system of this invention and shows the different types of valves it may include in different positions along the conveying line.

DETAILED DESCRIPTION OF THE INVENTION

Figure 10:
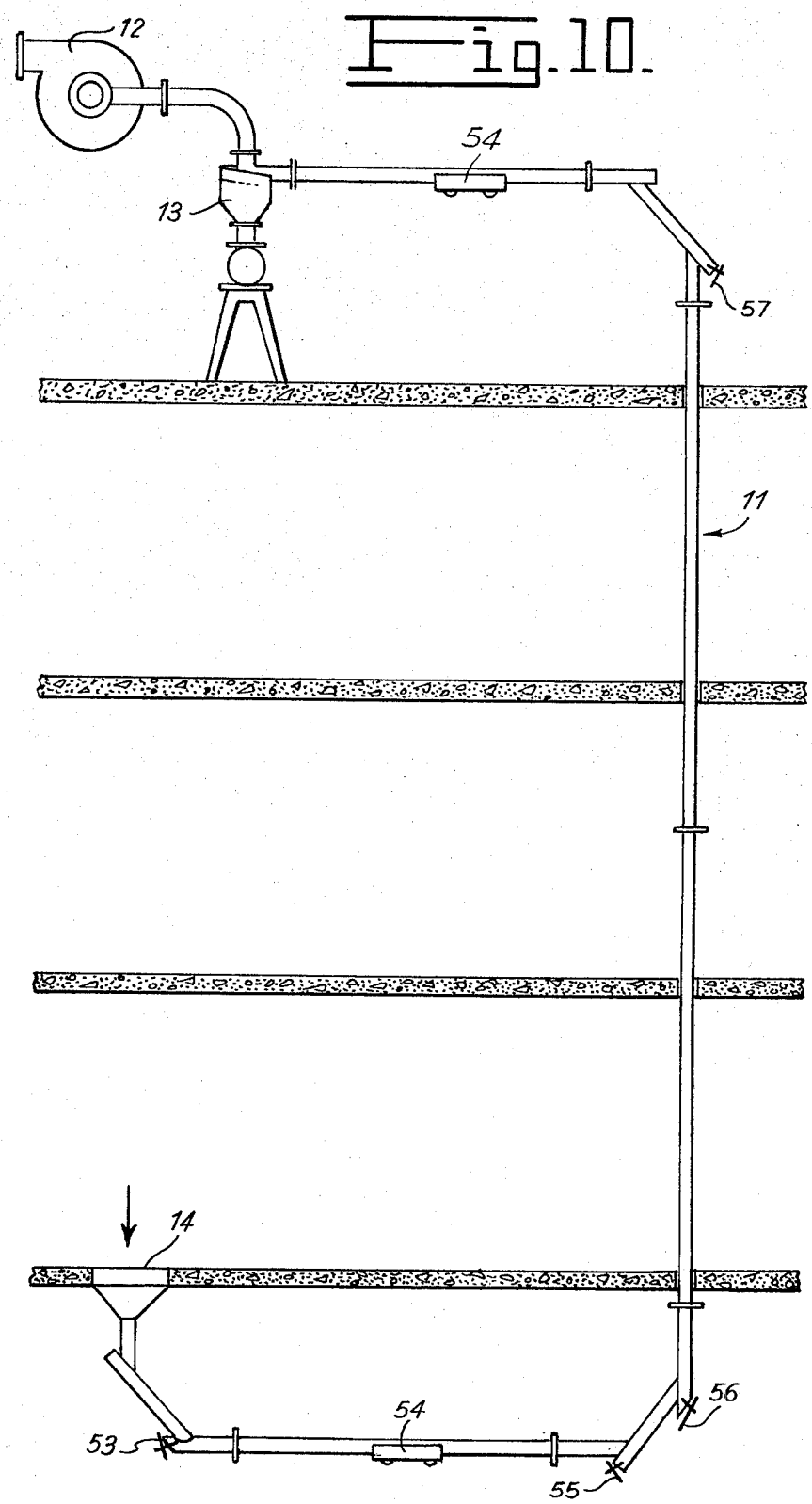
FIG. 10 is a schematic view which shows the complete pneumatic conveying system of wheat and which includes one of the embodiments of the system of this invention.

This invention refers to pneumatic conveying devices for bulk products and, more specifically, to a system of valves which operates automatically to prevent stoppage or choke in the pneumatic conveyance of milling products. The system of the invention comprises tubes for the conveyance of grain which form a pneumatic conveying line 11, an aspirator 12 and a grader 13 attached at one end of the conveying line 11 to move, by suction, milled grain which is introduced through a feeding hopper 14 fixed at the other end of the conveying line 11, which is shown in FIG. 10.

The conveying tubes which form the conveying line 11 may be straight conveying tubes 15, even those tubes which connect portions in which changes of direction take place (see FIG. 1), inasmuch as they are coupled in an over-lapping form in each portion in which changes of direction take place by means of which strong impacts of the product are avoided and the flow of said product is not interrupted. Besides the over-lapping coupling of the straight tubes 15, an end portion 16 of said tubes 15, which is open, protrudes from the coupling, for the purpose of avoiding turbulences and to allow exit of excess amounts of the load. These open end portions 16 are covered by means of flat plates 17 freely supported by hinges 18 and guides 19, which guides 19 are adjustably attached by means of pins 20 to the straight conveying tubes 15, and in this manner the distance and maximum angle of the opening of the flat plates 17 are regulated and consequently a level settling of the product in a position adequate for operation in accordance with the conditions of conveyance, the product, the volume and the air pressure is achieved.

The flat plates 17 may be properly defined as relief valves which open or close automatically depending on the flow pressure inside the conveying line 11. That is to say, these valves will remain closed under normal pressure and therefore, conveyance of the milled grain is achieved; on the other hand, they will immediately open if said pressure drops as a result of an obstruction caused by excess of the product, and consequently said excess of the product will be eliminated through the open end portions 16, inasmuch as the valves will yield under their own weight and, once the excess is eliminated, they will close as a result of the suction effect of the air as it attempts to reestablish the normal working pressure under normal load conditions.

On the other hand, as illustrated in FIG. 6, protective sleeves 21 are attached at each portion in which a change of direction takes place and said sleeves 21 form a chute which prevents the wear and tear of the conveying line 11 which would result from the impact of the product upon changing direction. These protective sleeves 21 are replaceable in order that once they become worn the conveying line 11 will continue to be preserved.

One embodiment of this invention, which is shown in FIG. 3, is that the conveying line 11 is formed by conveying tubes 22 which have curved extreme ends and which are coupled in an over-lapping manner at each portion in which a change of direction takes place, in the same as in the preceding embodiment. That is to say, these change of direction portions also include protruding open end portions 23 that correspond to the straight extreme ends of said conveying tubes 21 and are covered by means of flat plates 24 freely supported by hinges 25 and guides 26 which guides 26 are attached to the conveying tubes 22 by pins 27.

On the other hand, this embodiment illustrates another type of safety valve which is adequate for straight horizontal portions of the conveying line 11 which consists of an opening 28 in the bottom side of said straignt horizontal portions, and said opening 28 is covered by a circularly curved plate 29 which is freely supported at its ends, by bolts 30 connected to the conveyance tubes 22. This type of relief valve is shown in detail in FIG. 4.

Another embodiment of this invention, as may be seen in FIG. 5, consists of the conveying line 11 comprising straight grain conveying tubes 31 which are coupled by curved tubular connections 32, and, in this way, a conveying line similar to the one shown in FIG. 3, is formed and so it includes over-lapping couplings with protruding open end portions 33 which stick out of the coupling and which open end portions 33 are covered by flat plates 34 freely supported by hinges 35 and guides 36 adjustably fixed to the conveying tubes by pins 37. Furthermore, this FIG. 5 illustrates in the straight horizontal tube 31 a relief valve which consists of an opening 38 made in the bottom side of said tube 31, which opening 38 is covered by a circularly curved plate 39 freely supported at its ends by pins 40 attached to said horizontal straight conveying tube 31.

FIG. 7 illustrates a conveyance line 41 formed by straight and curved tubes which correspond to the type of conveying line conventionally used in well-known pneumatic conveying systems.

In straight vertical portions 42 and in straight horizontal portions 43 the conveying line 41 includes the relief valves which, in this embodiment comprise specifically for those in straight vertical portions 42 opposite openings 44, which are covered by circularly curved plates 45 slidingly supported at their lower ends by pins 46 which are attached to the corresponding straight vertical portion 42. Between these plates 45 there are stops 47 which are attached in the same way to the straight vertical portions 42, which stops 47 prevent the circularly curved plates 45 from turning and allowing the openings 44 to be left open. Said circularly curved plates 45 on the one hand, are located on the inside of a cylindrical cover 48 which is open at its lower end, which cover 48 allows the sliding action of said plates 45 and at the same time makes possible the exit of the grain through the openings 44 and it is emptied through said open lower end. This type of relief valve is shown in detail in FIG. 8.

The type of relief valves used in the horizontal portions 43 of the conveying line 41 consist of opposite lateral openings 49 made in said straight horizontal portions 43, the lateral openings 49, which are covered by circularly curved plates 50, are freely supported on their ends by pins 51, attached to the straight horizontal portions 43; furthermore, said circularly curved plates 50 are partially covered, along their entire lenght on the top side, by a semicircular cover 52 which is fixed to the upper part of the horizontal portion 43. This type of relief valve may be seen in detail in FIG. 9.

In this last embodiment we see that this invention may be adapted to normal types of pneumatic conveying lines, which are presently in use, without having to make total changes in the system.

The system shown in FIG. 11 is similar to that shown in FIG. 5 except that the conveying line includes a second straight horizontal grain conveying tube 31 provided with a similar relief valve to that which is provided in the lower straight horizontal tube of FIG. 5, and the straight vertical grain conveying tubes are provided with similar relief valves to those which are provided in the straight vertical portions of the system shown in FIG. 7.

The function of the system of valves which operates automatically to prevent stoppage or choke in the pneumatic conveyance by means of suction in this invention is achieved by extreme simplicity. In other words, by means of the aspirator 12 and the grader 13 and the use of suction, the grain is fed into the conveying line 11 through the feeding hopper 14 and as soon as any disturbance causes stoppage or choke in the conveying line 11, which is to say, that the conveying capacity is exceeded, the relief valves will operate in direct relationship to the intensity, speed, and force of the flow and introduction of the excess product and preferably in the following sequence (see FIG. 10):

Due to the increased load in the conveying line 11, the air pressure in the section farthest from the aspirator 12, which is to say the air pressure in the area nearest the feeding hopper 14, will decrease and a valve 53 will open as a result of the insufficient air pressure. When this happens, additional air will be admitted, allowing the continuation without interruptions of the conveyance of the product even if the extra load of the product continues to exist, and/or increases a little, inasmuch as the excess will be eliminated by said valve 53 without changing the normal conveying process.

Now, if the load excess suffers a greater increasement, a following valve will begin to work. This may be a valve 54 in the horizontal portion of the conveying line 11 or a valve 55 in the portions in which changes of direction take place.

In this manner the excess of the product will be eliminated through said valves 54 y 55 because the suction pressure will not be sufficient to hole them in a closed position and will not have reached the same with sufficient intensity since the excess of grain in the conveying line 11 will have reduced the air pressure.

In the case that a great amount of excess in the load is strongly fed into and fills the vertical portion of the conveying line 11, a valve 56 will open and the grain accumulated in said vertical portion of the conveying line 11 will be eliminated, through it, since, just as in the aforementioned cases, there will be insufficient air pressure to hold the valve closed.

Another problem that causes stoppage or choke in the conveying system, could be a drop in the voltage of the electric current causing a reduction in the velocity of the aspirator 12 which would consequently reduce the suction and the valves 53, 54, 55 and 56 would open, freeing the product which was blocking the conveying line 11. Furthermore, the conveying line 11 could include a valve 57 in that change of direction portion nearest the aspirator 12 and the grader 13, inasmuch as there could be occasions in which the disturbance causing the stoppage or choke might occur in the middle of the conveying operation and in which case it might be advantageous to eliminate, through said valve 57, the accumulated grain in the portion near said aspirator 12 and said grader 13.

Therefore, we can see that through the system of the present invention, the normal conveyance of the product will automatically be reattained as soon as the causes which provoked the choke or stoppage are eliminated since the valves will automatically close as a result of the suction of the air current which is reestablished.

On the other hand, the judgement used in the placement of the valves outlined in the present system is bases, above all, on the considerations of the areas most critical in stoppage or choke and taking into consideration that once the valve opens a current of air should be produced which will move the accumulated product in any part of the conveying line 11 the length of which shall not exceed, in dead weight of the accumulated product, the air pressure necessary to move said accumulated product. That is to say, the number of valves necessary shall be related with the horizontal length of the conveying line 11. Then, when stoppage or choke occurs the flow of air will be totally or partially cut off which in turn will totally stop the air pressure, bringing into action one or more of the valves which will open and eliminate the excess product which is causing stoppage or choke and at the same time air will be admitted and the flow reestablished, closing once again the valves.

Here we may see that the preferred embodiment for this invention is that in which the conveying line 11 is made up of, above all, straight conveying tubes 15, because strong impacts of the product will be avoided and, as a result of the locating of the relief valves there will be no interference with the flow of grain and the elimination of the same will be increased; likewise, there will be a level settling of the product in a position adequate for a conveying operation in accordance with the conditions of the same, of the grain, of the volume, and of the air pressure.

Finally, in order to further automate the system of valves which operates automatically to prevent stoppage or choke in the pneumatic conveyance of this invention, it may additionally include a micro-interruptor connected to the relief valves in such a way that it sends signals to a central control panel warning of abnormal situations in any conveying line of a factory.

Irrespective of the above description in relation to some of the specific embodiments of the invention, it must be understood by those experts in this field that any change in form and detail shall be made within the field and scope of the same.

I claim:

1. A duct system for pneumatic conveyance of milling products, comprising a conveying line constituted by straight horizontal portions each formed with an opening, straight vertical portions each formed with opposite openings, and change of direction portions joining the straight horizontal and vertical portions, and the system also comprising a plurality of circularly curved plates associated respectively with said openings in said straight horizontal portions and said openings in said straight vertical portions, and suspension means suspending the plates from said conveying line so that each plate is movable under influence of pressure difference between the interior of the conveying line and the exterior thereof between a position in which the plate covers the opening with which it is associated to close off said opening and a position in which it does not close off said opening, so that each plate provides an automatically-operating relief valve.

2. A duct system in accordance with claim 1, wherein the circularly curved plates associated with the openings in the straight horizontal portions are freely supported by said support means.

3. A duct system in accordance with claim 2, wherein a straight horizontal portion is formed with a single opening it its underside, and the support means include pins connected to that portion and freely supporting the circularly curved plate associated with said opening at its ends.

4. A duct system in accordance with claim 2, wherein a straight horizontal portion is formed with opposite openings and the support means include pins connected to that portion and freely supporting the circularly curved plates associated with the opposite openings respectively at their ends, the system also comprising a semi-circular cover fixed to the upper part of that straight horizontal portion and extending over the entire length of the circularly curved plates.

5. A duct system in accordance with claim 1, wherein the support means include pins connected to the straight vertical portions and slidingly supporting the circularly curved plates associated with the openings in the straight vertical portions.

6. A duct system in accordance with claim 5, wherein the circularly curved plates associated with the openings in the straight vertical portions are arranged in pairs, the plates of each pair being associated with the opposite openings respectively, and wherein the system comprises stops fixed to the straight vertical portions between each pair of plates to restrict movement thereof.

7. A duct system in accordance with claim 1, comprising a semi-circular cover fixed to the upper part of a straight horizontal portion and extending over the entire length of the circularly curved plate associated with the opening in that portion.

8. A duct system in accordance with claim 1, comprising a cylindrical cover open at its lower end and fixed to a straight vertical portion to house the circularly curved plates associated with the group of opposite openings in that portion.

9. A duct system in accordance with claim 1, wherein the conveying line is integral, constituted by continuously coupled horizontal, vertical and change of direction portions, and the straight horizontal portions are each formed with opposite openings, and the system comprises a semi-circular cover fixed to the upper part of a straight horizontal portion and extending over the entire length of the circularly-curved plates associated with the group of opposite openings in that horizontal portion, and a cylindrical cover open at its lower and fixed to a straight vertical portion to house the circularly curved plates associated with the group of openings in that vertical portion.

10. A duct system in accordance with claim 1, wherein the conveying line portions overlap at change of direction portions in order that an end region of one of said portion protrudes, the protruding end region being open and the system comprising a flat plate associated with the open end, and coupling means connecting the flat plate to the change of direction portion in such a manner that the flat plate is freely movable under influence of pressure difference between the interior of the conveying line and the exterior thereof between a position in which it covers the open end to close off the opening and a position in which it does not close off said opening, thereby to provide an automatically-operating relief valve.

11. A duct system in accordance with claim 10, wherein the change of direction portions are straight.

12. A duct system in accordance with claim 10, wherein the change of direction portions are curved and are each integral with a straight portion of the conveying line.

13. A duct system in accordance with claim 10, wherein the straight horizontal and vertical portions of the conveying line are straight conveying tubes and the change of direction portions are curved conveying tubes connecting the straight horizontal and vertical portions.

14. A duct system in accordance with claim 10, wherein the coupling means coupling the flat plate to the change of direction portion include hinges and guides for adjusting the flate plate with respect to said open end.

15. A duct system in accordance with claim 14, comprising a removable protective sleeve fitted within the protruding end region.

16. A duct system in accordance with claim 1, wherein the relief valves are placed in the conveying line considering portions of same no longer in dead weight of the product accumulated than the air pressure necessary to remove said accumulated product.

* * * * *